June 22, 1943.　　　　　H. T. STILES　　　　　2,322,721
METHOD OF AND APPARATUS FOR STERILIZING MILK
Filed Jan. 13, 1939　　　2 Sheets-Sheet 1
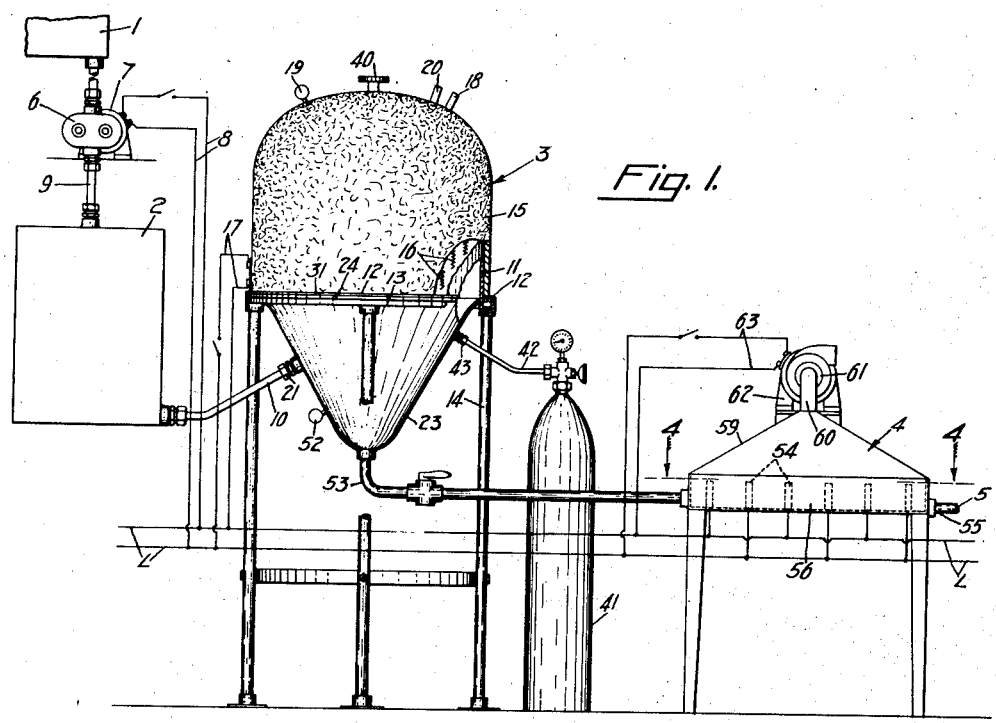
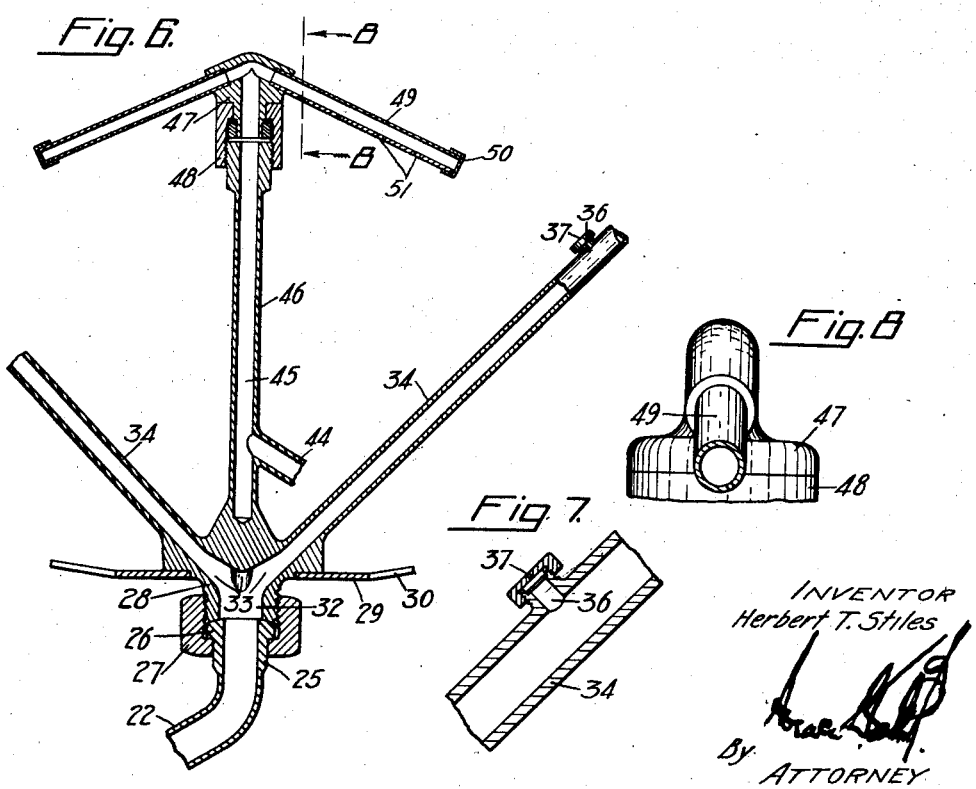
INVENTOR
Herbert T. Stiles
By ATTORNEY June 22, 1943.  H. T. STILES  2,322,721
METHOD OF AND APPARATUS FOR STERILIZING MILK
Filed Jan. 13, 1939  2 Sheets-Sheet 2
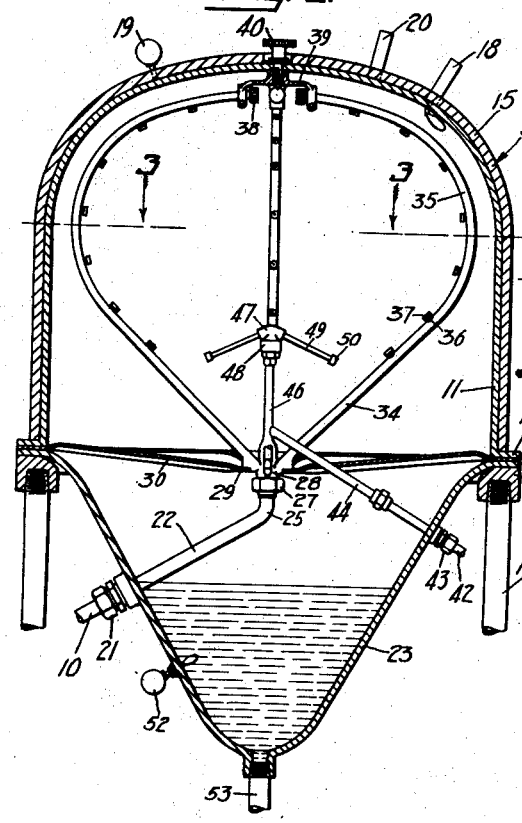
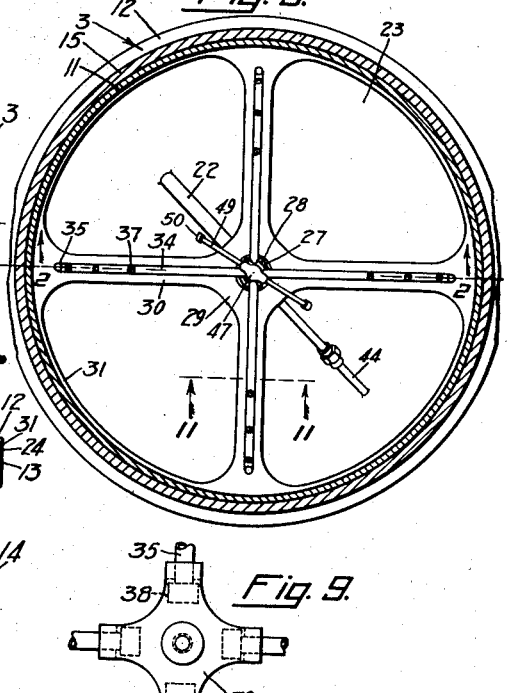
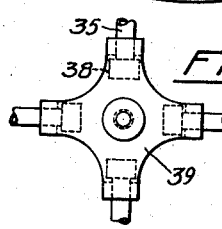
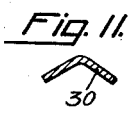
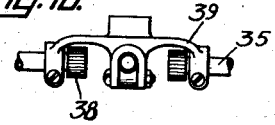
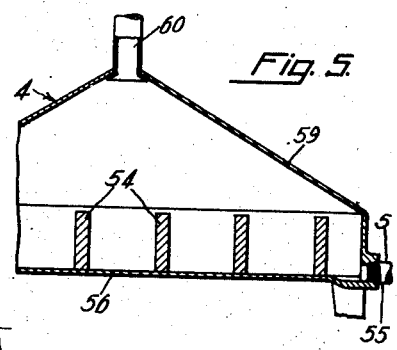
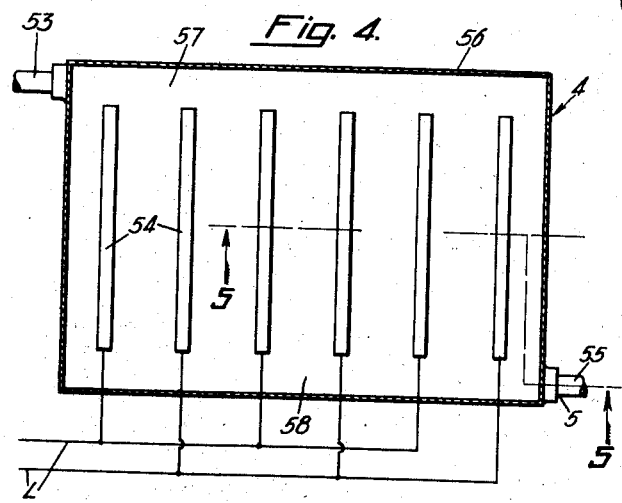
INVENTOR
Herbert T. Stiles
By
ATTORNEY Patented June 22, 1943

2,322,721

UNITED STATES PATENT OFFICE 2,322,721

METHOD OF AND APPARATUS FOR STERILIZING MILK

Herbert T. Stiles, Suffield, Conn.

Application January 13, 1939, Serial No. 250,776

15 Claims. (Cl. 99—212)

My invention relates to methods of and apparatus for sterilizing milk.

It has heretofore been proposed to sterilize milk by pasteurizing the same. However, the process of pasteurization is a slow one, and requires considerable expensive equipment, it being necessary not only initially to cool the milk, but thereafter to heat it to a temperature of between 145° and 155°, and thereafter to maintain it at that temperature for a considerable time, whereupon the milk has to be cooled again before it is bottled. As a result, approximately an hour is required to effect pasteurization, and the equipment is so expensive as to make it impractical, even for farms milking as many as one hundred cows, to provide such equipment. Accordingly, it has been the practice only for very large dairy farms to provide pasteurizing equipment. Further, the cost of pasteurization is high, running from one half to one cent a quart.

My invention has among its objects to produce an improved method of and apparatus for sterilizing milk, whereby these objections to pasteurization are overcome. A further object of my invention is to produce such an improved method and apparatus whereby it is made possible very substantially to reduce the time required for sterilization, while also making it possible for this operation to be performed with such a minimum of equipment as substantially to extend the possible use of sterilizing apparatus on dairy farms. Still further objects of my invention are to make it possible to eliminate not only all necessity for initially cooling the milk, but also to eliminate any necessity for storage, and further to make it possible to sterilize the milk as it comes directly from the milking machine, and as it moves continuously from the latter to the bottling machine. Still further objects of my invention are to lower the bacteria count and the sterilizing cost per quart very substantially as compared with pasteurizing. These and other objects of my improvements will, however, hereinafter more fully appear.

In the accompanying drawings, I have shown for purposes of illustration one form of apparatus on which my improved method may be practiced.

In these drawings:

Figure 1 is a diagrammatic side elevation of this apparatus, a portion of the chlorinating jar being broken away to facilitate illustration, and the wiring connections of the various devices being diagrammatically shown;

Fig. 2 is a vertical central sectional view through the chlorinating jar, the view being taken approximately on line 2—2 of Figure 3;

Fig. 3 is a transverse section on line 3—3 of Figure 2;

Fig. 4 is a diagrammatic sectional view of the electric sterilizer, the same being shown in section on line 4—4 of Figure 1;

Fig. 5 is a partial vertical section on line 5—5 of Figure 4;

Fig. 6 is an enlarged vertical section of the rotary gas distributor mechanism, as well as the milk supply connections shown in Figure 2;

Fig. 7 is a detail sectional view of one of the milk jets or nozzles;

Fig. 8 is a sectional view on line 8—8 of Figure 6 showing one of the gas jets on the rotary distributor;

Fig. 9 is a detail plan view of the supports for the milk distributor connections at the top of the chlorinating jar;

Fig. 10 is a side elevation of the connections shown in Figure 9, and

Fig. 11 is a detail sectional view on line 11—11 of Figure 3.

Referring more particularly to this illustrative apparatus, it will be noted that the milk from the milking machines is delivered directly to a receiving tank 1 and moves continuously therefrom to a pressure tank 2 and to and through a chlorinating mechanism, generally indicated at 3, wherein the milk is chlorinated by what may be called a flash system, quickly and effectively, and thereafter continuously supplied to an electric sterilizer and separator, generally indicated at 4, from which the milk also passes continuously to bottling mechanism (not shown) through an outlet 5; these several mechanisms each being improved and cooperating in an improved manner to produce improved results, as hereinafter more fully described.

In my improved construction, the milk in the tank 1 is preferably supplied to the tank 2 under pressure, as, for example, by a suitable pump 6, herein an electrically operated pump having a motor 7 connectible by conductors 8 to the main power line L. While the pressure in the tank 2 may vary, a pressure of 35 to 40 pounds is preferably provided therein, it being found that such a pressure is adequate to maintain the desired spraying action within the chlorinating mechanism 3. Thus, as milk is supplied from the milking machines, it is pumped continuously by the pump 6 through a pipe connection 9 between the tanks 1 and 2 and from the latter through a pipe 10 to the chlorinating mechanism 3.

This chlorinating mechanism, as shown in Figures 2, 3 and 6, is herein of improved construction adapted to make an improved flash chlorination possible. As illustrated, it includes a dome or inverted jar 11, preferably of glass or other like material and adapted to be readily and completely cleansed. Herein, this jar has an open bottom, a substantially cylindrical portion above the latter, and a dome-like closed top. This jar herein also has an annular flange 12 on its bottom supported on a suitable supporting ring 13 carried on the top of an upstanding skeleton frame, herein including spaced uprights 14. Moreover, it will be noted that outside the jar 11 and snugly fitted around the latter is improved electric heating means, herein in the form of a heating pad 15 having suitable heating elements 16 distributed over the same in such manner as to heat the jar 11 effectively and quite uniformly over its entire area; these heating coils 16 herein being connected to the line L through usual conductors 17. As a result of this construction, it will be evident that with the heating coils 16 suitably externally insulated, it is possible to heat the jar 11 over its entire area, and accordingly produce a quite high temperature within the latter. While this temperature may vary, a temperature of approximately 200° in the space toward the top of the jar is preferred. Here also, it will be noted that a thermometer 18 is also preferably connected at the top of the jar 11 and extending into the latter, while a suitable pressure gauge 19 and a suitable pressure release valve 20 for the escape of gas under conditions of improper operation, are similarly provided on the top of the jar communicating with the interior thereof.

Herein, improved milk spraying means are provided within the jar which spray therein the milk received from the pressure tank 2 through the pipe connection 10, in such manner as thereby effectually to prepare the same for thorough and quick chlorination as hereinafter described. As shown, the connection 10 is suitably removably connected, as at 21, to a pipe 22 extending inward and having a portion extending axially upward along the axis of the jar and a funnel 23 underlying the jar 11, this funnel herein likewise having a flange 24 on its top supported on the ring 13 between the latter and the jar flange 12. This pipe 22 is herein provided with a short upwardly extending portion 25 provided with an annular flange 26 at its upper end and removably connected, as by a flange nut 27, to the lower end of a milk distributing head or member 28, herein supported on the body of a spider 29 having a series of, herein four, spaced arms 30 also connected at their periphery by an annular flange 31 disposed between the flanges 12 and 24 heretofore described. This member 28, as shown, is provided with a large axial milk receiving passage 32 in its bottom and with communicating milk distributing passages 33 in a suitable number of milk spraying arms 34, herein four and disposed over the spider arms 30. As shown, these spraying arms 34 extend upwardly and outwardly from the member 28 at the bottom of the jar 11 to a point substantially midway between the top and the bottom thereof, where they are curved relative to the jar axis, as at 35, in such manner as to conform generally to the curvature of the inside surface of the top portion of the jar, the curvature of these arms 34 herein being such as to maintain the same equally spaced from the inside surface of the jar 11 throughout the remainder of the length of these arms. Moreover, it will be observed that beginning at a point substantially above the member 28, each of these arms is provided with suitable spaced outlets 36, herein carrying spray nozzles 37 suitably connected over the same, all of these outlets and nozzles herein being on the inside of the arms, in such manner that all jets of milk are delivered in intersecting paths in intersecting planes and away from the inside surface of the jar 11. Further, it will be observed that herein the upper ends of the curved portions 35 on the spray arms 34 are provided with suitable end closures 38, and that all of these ends are suitably supported in a single axially disposed overhanging bracket 39 suitably connected, as by an axially disposed threaded member 40, herein connectible or releasable from outside the jar 11 and heating pad 15. As a result of this construction, it will be apparent that milk may be supplied under pressure through the pipe connections 10 and 22 and will be delivered in the form of sprays from the nozzles 37 within the curved portions 35 of the spray arms 34, all while maintaining the sprayed milk in an area spaced from the inner walls of the heated jar 11.

Here it will also be noted that the structure is such as to minimize accumulations of milk thereon and to make it possible for all of the milk supply connections to be readily cleansed. To this end, the surfaces of the member 28 and arms 34 are so shaped and disposed as to expedite complete drainage. Further, the spider arms 30 are also both downwardly sloped toward the center of the jar and made of ridged cross section, as shown in Figure 11. Also, all connections are adapted to be separated to permit thorough cleansing, for example, the member 28 being removable upon removing the bracket 39 and nut 27, and the arms 34 forming a unit with this member 28 being readily cleansed when their end closures 38 are removed.

Operating upon the milk while it is in process of being sprayed inside the jar 11 as above described, is also improved means for delivering chlorine gas inside the jar in such manner as to effect a flash chlorination of the milk while the latter is in spray form. This means herein, as in a preferred construction, is also carried by the member 28, in such manner as also to be bodily removable therewith. It will be noted, moreover, that it is disposed toward the bottom of the jar 11 and herein delivers below and away from the lowermost nozzles 37, which it will be noted herein deliver generally upwardly. Herein, this delivery means includes improved rotary means for distributing the gas in such manner as very effectively to sterilize the milk spray by contact, and so quickly as not to saturate the milk. Also, the gas is supplied from a suitable tank 41 through a pipe connection 42, the latter being removably connected, as at 43, to the funnel 23 and also connected through a suitable connection 44 to a vertically disposed passage 45 in an extension 46 extending upward axially of the member 28. Further, it will be observed that this member 46 has a swivel head 47 on its upper end suitably connected thereto, as by a flanged sleeve 48, and that this head has any suitable number of, herein two, gas distributing pipes or arms 49 extending downwardly and outwardly therefrom, herein in the same plane and on opposite sides of the head 47. As shown, each of these members is in the form of a tube threaded into the member 47 at its upper end and having a removable closure 50 on its outer end, and is furthermore provided with a series of spaced and downwardly and inwardly directed apertures 51. These apertures are also directed at a slight angle to the vertical plane including the arms 49 (Fig. 8), the apertures in one arm 49 being directed on one side of this plane while the apertures in the diametrically opposed arm are directed on the opposite side of the plane, as will be evident from Fig. 6. Thus, when gas under the pressure maintained in the tank 41, usually 100 pounds, is supplied through the pipe connections 42, 44 to the vertical supply connection 45 and from the latter to the distributing pipes 49, it will be apparent that the pressure of the gas discharged through the outlets 51 will cause these pipes 49 and the head 47 to rotate on the member 46 as the gas escapes through the several ports 51 in each of the pipes 49, all in such manner as thereby quite uniformly to distribute the gas over an area below the rotating distributor thus provided and in the path of the falling milk spray.

In the operation of my improved mechanism, it will be observed that the heat within the jar 11 will act upon the gas escaping from the apertures 51 and cause the same to rise toward the top of the jar 11, through the milk spray and as the milk is flowing downward. Further, with the high temperature obtainable by reason of the heating pad, it will be evident that the gas will rise very rapidly. Also, as a result of the dispersion of the milk into spray form, and the pressure at which the milk is discharged downwardly, it will be evident that the actual time of contact between the downwardly moving milk and the upwardly moving gas will be very short, and such as to produce only a momentary or flash contact. Nevertheless, all of the milk so sprayed will be brought into contact with the rising gas to a sufficient extent to insure the destruction of bacteria, the desired uniformity in results being materially assisted by the distributing action of the rotating gas distributor and the distribution of the milk in spray form and in intersecting paths in spaced areas determined by the radially located spray arms provided. Attention here is moreover directed to the fact that the inside surface of the jar 11 is so heated by the heating pad 15 as to tend to drive the gas away from the sides of the jar, and thereby cause the same to pass upward through the downwardly moving milk. Further, it will be evident that the effect of the temperature on the gas is not only such as to make the same pass upward rapidly through the milk, as described, but also such as to prevent the gas from settling on any milk in the funnel 23. Instead, the milk, after being subjected to a flash sterilization by the gas, will pass quickly wholly out of the zone thereof and down through the openings between the arms 30 of the spider 29 into the funnel 23 from which it is continuously discharged. Attention here is also directed to the fact that when thus received into the funnel 23, the milk has a temperature of approximately 140° to 150°, i. e. substantially below 160°, the temperature at which the milk degenerates and begins to acquire a so-called "cooked" taste. Here note that, in order to provide a further suitable check on the operation of the apparatus, a suitable thermometer 52 is carried by the funnel 23.

Operating upon the milk as it flows continuously out of the bottom of this funnel 23, is also improved cooperating sterilizing and air suction mechanism. As shown, the milk flows from the bottom of the funnel 23 through a pipe connection 53 which conveys it to the electric sterilizer 4. Herein, this sterilizer has electrodes 54 of generally common type, but the same herein are laterally spaced upright members disposed in parallel relation on the bottom of the milk chamber in such manner as to require a horizontal flow therethrough. Moreover, it will be observed that the milk inlet connection 53 and the milk outlet connection 55 are disposed at diagonally opposite corners of the sterilizer casing 56, in such manner that the milk must flow slowly along and between the electrodes 54 in passing from one side passage 57 of that casing, communicating with the inlet 53, to the opposite and parallel side passage 58 thereof, communicating with the outlet 55, all in such manner as thereby to insure effective supplementary sterilization and maintain a temperature of approximately 150° as the milk flows through the electric sterilizer. Attention here is further directed to the fact that this milk flow so distributes the milk that the same is spread over a quite considerable area, while being acted upon by the electric sterilizer, and in such manner as thereby to free or separate out any gas which may be entrained therein. Moreover, attention is directed to the fact that improved means are provided for drawing away any remaining gas without reducing the temperature of the milk to any appreciable extent, a suction hood 59 being provided which encloses the top of the sterilizer casing 56 and is provided with a suction connection 60, herein connected to a suitable suction pump 61 driven by a motor 62 and connected by the usual conductors 63 to the line L. Thus, when the milk passes out of the electric sterilizer outlet 55, the same is at a temperature and in such condition that it may be supplied through usual cooling mechanism to a usual bottling mechanism.

As a result of my improvements, it is found that the complete process of sterilization can be carried out in only a fraction of the time heretofore required in pasteurization. In fact, it is possible to complete the entire circuit of the milk from the milking machine into the bottles in approximately five minutes. Further, the milk when so treated, due to my improved flash process, is wholly free either from any suggestion of chlorine or of a "cooked" taste, while, the whole process being performed in a sealed circuit, the bacteria count is substantially lower than that obtained by pasteurization. At the same time that the cost of the equipment is substantially less than that required for pasteurization, it will also be evident that the operating cost of the necessary equipment is negligible, the operating cost per quart of milk amounting to only a minute fraction of a cent, as compared with varying from a half a cent to a cent per quart for pasteurization. Moreover, the apparatus is such that once the routine is learned, the process is capable of being carried out by the average dairy farmer who, through the now quite general use of chlorine for cleansing purposes, is already familiar with the use of the same. These and other advantages of my improvements will, however, be apparent to those skilled in the art.

While I have herein specifically described my improved method in connection with one form of apparatus capable of use in carrying out the same, it will be evident that my improved method may be practiced in connection with other apparatus, and it will further be understood that both my improved method and apparatus have been described herein for illustrative purposes and may be modified without departing from the spirit of my invention or the scope of the appended claims.

What I claim as new and desire to secure by Letters Patent is:

1. The step in sterilizing milk which consists in, flash sterilizing milk spray with previously unheated chlorine gas while heating the gas to cause it to rise through the milk spray and maintaining the gas out of contact with the collecting bulk milk.

2. The method of sterilizing milk which consists in, flash sterilizing the milk in a heated chamber while the milk is in spray form by exposing the sprayed milk to previously unheated sterilizing chlorine gas heated and rising in said heated chamber, and collecting the sterilized milk in bulk form outside the sterilizing zone in said heated chamber.

3. The method of sterilizing milk which consists in, spraying the milk in a dome, discharging sterilizing chlorine gas into said dome into intimate contact with the milk spray, heating said dome to heat said gas to cause it to expand and rise while activating the same, and collecting the sterilized milk in bulk form in a lower temperature zone below said heated dome.

4. The method of sterilizing milk which consists in, delivering milk in spray form toward the center of a sterilizing chamber, expanding sterilizing chlorine gas in said chamber below the sprayed milk, and heating the walls of said sterilizing chamber to heat said gas to cause it to move inwardly and upwardly through the descending milk spray.

5. The method of sterilizing milk which consists in, flash sterilizing the milk while the latter is in spray form with rising sterilizing chlorine gas, collecting the sterilized milk in bulk form while maintaining the bulk milk out of contact with the gas, and liberating any sterilizing gas in the bulk milk.

6. The method of sterilizing milk which consists in, flash sterilizing the milk while the latter is in spray form with rising sterilizing chlorine gas, collecting the sterilized milk in bulk form while maintaining the bulk milk out of contact with the gas, and liberating any sterilizing gas in the bulk milk by subjecting the bulk milk to a suction.

7. Milk sterilizing apparatus including a sterilizing chamber having an open bottom, milk spraying means delivering into said chamber, means for delivering sterilizing gas into said chamber above the open bottom thereof, means for heating said chamber to heat the gas and cause the same to rise in said chamber through the falling milk spray, and unheated milk collecting means below the open bottom of said heated chamber maintaining the sterilized bulk milk out of contact with the rising gas.

8. Milk sterilizing apparatus including a dome open at the bottom and forming a sterilizing chamber above said open bottom, milk spraying mechanism in said dome delivering milk in spray form inwardly from the walls of said dome toward the center of said chamber, means for introducing a sterilizing gas into said chamber below said milk spraying mechanism, and means for heating the top and adjacent side walls of said dome to heat said gas and cause said gas to rise through the milk sprayed in said dome.

9. Milk sterilizing apparatus including a dome open at the bottom and forming a sterilizing chamber above said open bottom, milk spraying mechanism in said dome for directing milk in spray form inwardly into said chamber, sterilizing gas delivering mechanism delivering gas in said chamber below said spraying mechanism, means for heating the portion of the walls of said dome in the vicinity of and enclosing said milk spraying mechanism to cause said gas to rise through the falling spray, and an unheated milk receptacle beneath the open bottom of said chamber and beneath said delivering mechanism receiving the milk after it passes through the rising gas and collecting the milk in bulk form out of contact with said gas.

10. Milk sterilizing apparatus including a dome open at the bottom and forming a sterilizing chamber above said open bottom, milk spraying mechanism extending into the top of said dome and discharging toward the inside of said chamber, sterilizing gas delivering mechanism delivering gas adjacent the bottom of said dome and delivering below the milk spraying mechanism therein, and means for heating the top and adjacent side walls of said dome to cause said gas to rise in said chamber into said milk spray, said spraying mechanism comprising a series of spray arms having spray outlets delivering away from the inside surface of said dome and said gas delivering means being disposed below said spray outlets on said arms.

11. In a milk sterilizing machine, a dome open at the bottom and forming a sterilizing chamber above said open bottom, an external heating pad enclosing the top and adjacent side walls of said dome and heating the same, milk spraying mechanism inside said dome, means for supplying sterilizing gas through the sprayed milk in the area heated by said heating pad, and an unheated bulk milk receptacle below the open bottom of said dome closing the latter and collecting the sprayed milk out of contact with said rising gas and said heated dome.

12. Apparatus for sterilizing milk including mechanism for flash sterilizing the same with chlorine gas, receiving means receiving the sterilized bulk milk therefrom, means for maintaining a continuous flow of milk through said flash sterilizing mechanism and said receiving means, and suction means for removing any liberated gas from the bulk milk while flowing in said receiving means.

13. Apparatus for sterilizing milk including a receptacle for receiving milk from milking machines, mechanism for flash chlorinating the milk, flow controlling means for directing the chlorinated milk over a large area including flow directing baffles in the path of the milk, means for continuously supplying the milk from said receptacle through said flash chlorinator and said flow controlling means, and suction means for removing any liberated gas from the bulk milk while flowing in said flow controlling means.

14. Apparatus for sterilizing milk including mechanism for flash sterilizing the milk with sterilizing chlorine gas, means for collecting the sterilized milk in bulk form out of contact with the gas, flow directing baffle means receiving bulk milk from said collecting means, and means for drawing off gas from said receiving means.

15. In a milk sterilizing mechanism, milk spraying mechanism including upwardly directed radially located spraying arms delivering inwardly and comprising a series of upwardly and inwardly directed curved arms approaching one another at the top, and sterilizing gas distributing mechanism projecting upward into the space between said arms and having rotating gas distributing arms rotating in said space and delivering gas in the path of the falling milk spray.

HERBERT T. STILES.